US010796310B2

(12) United States Patent
Hammad

(10) Patent No.: US 10,796,310 B2
(45) Date of Patent: Oct. 6, 2020

(54) APPARATUS INCLUDING DATA BEARING MEDIUM FOR REDUCING FRAUD IN PAYMENT TRANSACTIONS USING A BLACK LIST

(71) Applicant: Visa International Service Association, San Francisco, CA (US)

(72) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 639 days.

(21) Appl. No.: 15/182,448

(22) Filed: Jun. 14, 2016

(65) Prior Publication Data

US 2016/0292692 A1    Oct. 6, 2016

Related U.S. Application Data

(63) Continuation of application No. 12/507,750, filed on Jul. 22, 2009, now Pat. No. 9,396,465.

(51) Int. Cl.
*G06Q 20/00* (2012.01)
*G06Q 40/00* (2012.01)
(Continued)

(52) U.S. Cl.
CPC ........ *G06Q 20/4016* (2013.01); *G06Q 20/12* (2013.01); *G06Q 20/20* (2013.01);
(Continued)

(58) Field of Classification Search
None
See application file for complete search history.

(56) References Cited

U.S. PATENT DOCUMENTS 5,386,104 A    1/1995  Sime
5,819,226 A   10/1998  Gopinathan et al.
(Continued)

FOREIGN PATENT DOCUMENTS

WO    01/67201 A2    9/2001
WO    02/27610 A1    4/2002
(Continued)

OTHER PUBLICATIONS

Notice of Allowance dated Mar. 15, 2016, U.S. Appl. No. 12/507,750 (7 pages).
(Continued)

*Primary Examiner* — Ariel J Yu
(74) *Attorney, Agent, or Firm* — Kilpatrick Townsend & Stockton LLP

(57) ABSTRACT

A system, apparatus, and method for reducing fraud in electronic payment transactions. The apparatus includes a processor that executes instructions to implement a process to identify consumer or merchant devices that have been used in fraudulent transactions and prevent the authorization of future transactions that are initiated using those devices. By collecting device data as part of authorization messages and processing that data, devices that are used in fraudulent transactions with different merchants or involving different accounts may be identified and prevented from being the source of future transactions. This prevents future losses and reinforces the integrity of the transaction system.

18 Claims, 5 Drawing Sheets

(51) Int. Cl.
    *G06Q 20/40* (2012.01)
    *G06Q 20/12* (2012.01)
    *G06Q 20/20* (2012.01)
    *G06Q 30/06* (2012.01)
    *G06Q 40/02* (2012.01)

(52) U.S. Cl.
    CPC ........... *G06Q 20/204* (2013.01); *G06Q 20/40* (2013.01); *G06Q 30/06* (2013.01); *G06Q 40/02* (2013.01); *G06Q 40/12* (2013.12)

(56) References Cited

U.S. PATENT DOCUMENTS

| | | | |
|---|---|---|---|
| 6,108,642 | A | 8/2000 | Findley |
| 6,157,707 | A | 12/2000 | Baulier et al. |
| 6,158,010 | A | 12/2000 | Moriconi et al. |
| 6,330,546 | B1 | 12/2001 | Gopinathan et al. |
| 6,601,048 | B1 | 7/2003 | Gavan et al. |
| 6,714,919 | B1 | 3/2004 | Findley |
| 6,868,391 | B1 | 3/2005 | Hultgren |
| 7,158,947 | B1 | 1/2007 | Findley |
| 7,251,624 | B1 | 7/2007 | Lee et al. |
| 7,376,431 | B2 | 5/2008 | Niedermeyer |
| 7,433,855 | B2 | 10/2008 | Gavan et al. |
| 7,610,040 | B2 * | 10/2009 | Cantini ............ G06Q 20/04 340/5.9 |
| 7,657,460 | B2 | 2/2010 | Findley |
| 7,668,769 | B2 | 2/2010 | Baker et al. |
| 7,752,084 | B2 | 7/2010 | Pettitt |
| 8,165,965 | B2 * | 4/2012 | Ritter ............... G06Q 20/00 705/41 |
| 2003/0069820 | A1 * | 4/2003 | Hillmer ............ G06Q 20/206 705/35 |
| 2003/0097330 | A1 | 5/2003 | Hillmer et al. |
| 2004/0088238 | A1 | 5/2004 | Gilson |
| 2006/0095369 | A1 | 5/2006 | Hofi |
| 2006/0282660 | A1 | 12/2006 | Varghese et al. |
| 2007/0061259 | A1 | 3/2007 | Zoldi et al. |
| 2007/0164102 | A1 * | 7/2007 | Haertel ............ G06Q 20/204 235/380 |
| 2007/0192249 | A1 | 8/2007 | Biffle et al. |
| 2007/0282674 | A1 | 12/2007 | Gomes et al. |
| 2007/0288641 | A1 | 12/2007 | Lee et al. |
| 2009/0313134 | A1 | 12/2009 | Faith et al. |
| 2012/0158540 | A1 | 6/2012 | Ganti |

FOREIGN PATENT DOCUMENTS

| | | |
|---|---|---|
| WO | 05/077066 A2 | 8/2005 |
| WO | 07/041709 A1 | 4/2007 |

OTHER PUBLICATIONS

Non-Final Office Action dated Nov. 12, 2015, U.S. Appl. No. 12/507,750 (20 pages).

Final Office Action dated Apr. 15, 2015, U.S. Appl. No. 12/507,750 (16 pages).

Non-Final Office Action dated Nov. 10, 2014, U.S. Appl. No. 12/507,750 (15 pages).

Non-Final Office Action dated May 9, 2014, U.S. Appl. No. 12/507,750 (11 pages).

Final Office Action dated Jul. 22, 2011, U.S. Appl. No. 12/507,750 (10 pages).

Non-Final Office Action dated Apr. 12, 2011, U.S. Appl. No. 12/507,750 (8 pages).

* cited by examiner

APPARATUS INCLUDING DATA BEARING MEDIUM FOR REDUCING FRAUD IN PAYMENT TRANSACTIONS USING A BLACK LIST

CROSS-REFERENCES TO RELATED APPLICATIONS

This application is a continuation application of and claims priority to U.S. patent application Ser. No. 12/507,750 entitled, "APPARATUS INCLUDING DATA BEARING MEDIUM FOR REDUCING FRAUD IN PAYMENT TRANSACTIONS USING A BLACKLIST" filed Jul. 22, 2009. The following patent applications are incorporated by reference in their entirety: U.S. patent application Ser. No. 12/507,745, entitled "Apparatus Including Data Bearing Medium For Authorizing a Payment Transaction Using Seasoned Data" and U.S. patent application Ser. No. 12/507,757, entitled "Apparatus Including Data Bearing Medium for Seasoning a Device Using Data Obtained From Multiple Transaction Environments" each filed on Jul. 22, 2009.

BACKGROUND

Embodiments of the present invention are directed to systems, apparatuses and methods for enabling electronic payments and the processing of payment transaction data, and more specifically, to identifying consumer devices that may be the source of fraudulent transactions and preventing the authorization of future transactions initiated by consumers using those devices.

Consumer payment devices such as debit cards or credit cards are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Some or all of the data read from the payment device is provided to the merchant's transaction processing system and then to the Acquirer, which is typically a bank or other institution that manages the merchant's account. The data provided to the Acquirer may then be provided to a payment processing network (e.g., a payment processor) which processes the data to determine if the transaction should be authorized by the network, and assists in the clearance and account settlement functions of the transaction. The authorization decision and clearance and settlement portions of the overall transaction may also involve communication and/or data transfer between the payment processing network and the bank or institution that issued the payment device to the consumer (the Issuer). Transactions in which a consumer payment device is presented to a merchant or accessed by a point of sale terminal are termed "card present" transactions since the payment device is in the same physical location as the merchant or terminal.

In addition to card present transactions, a consumer may also initiate a transaction in a situation in which the payment device is not in the same physical location as the merchant or terminal and instead the relevant data is provided over a communications network to the merchant (termed a "card not present" transaction). For example, a transaction involving the purchase of a product or service may be initiated by a consumer by providing payment data from a remote location to a merchant over a network such as the Internet. Transactions of this type are typically initiated using a computing device such as a personal computer or laptop computer. Transactions may also be initiated by using a mobile device such as a cell phone or personal data assistant (PDA) that communicates with a merchant or service provider directly or indirectly over a wireless network (which may be configured to enable data transfer between the wireless network and the Internet). Thus, payment information for a transaction may be provided using a payment device and point of sale terminal, remotely located computing device, or mobile device capable of wireless communications, among other methods.

Given the large number of transactions and amounts of money involved, the detection and prevention of fraud is an important consideration of any transaction processing system. However, this function is made more difficult in the case of transactions that are conducted using remote devices such as computers or mobile phones. This is because the same device might be used by different users, each having a separate account. In addition, the same user might have different accounts but use a common device for purchases, or the same user might make purchases from multiple merchants on the same account using the same device. In each of these situations, an account or a specific device used to initiate transactions might be determined to be the source of fraud, but this information would typically only be known to the merchant that was involved in the fraudulent transaction. Each merchant is in the position of having to identify fraudulent transactions by themselves, usually through notice of a chargeback or non payment for goods, and as a result determine that the account or device was not trustworthy. Since information about fraudulent transactions is typically not shared between merchants, there can be delays in identifying fraudulently used accounts or devices. This can result in increased risk and greater losses to merchants and the overall transaction processing network.

What is desired is a system, apparatus and method for reducing fraud in electronic payment transactions by more rapidly identifying devices that are used in potentially fraudulent transactions and preventing use of those devices in subsequent transactions. Embodiments of the invention address these problems and other problems individually and collectively.

SUMMARY

Embodiments of the present invention are directed to a system, apparatus, and method for reducing fraud in electronic payment transactions. In some embodiments, the invention is directed to an apparatus that includes a processor that executes instructions to implement a process to identify consumer or merchant devices that have been used in fraudulent transactions and prevent the authorization of future transactions that are initiated using those devices. For example, by collecting device data as part of authorization messages and processing that data, devices that are used in fraudulent transactions with different merchants or involving different accounts may be identified and prevented from being the source of future transactions. This prevents future losses and reinforces the integrity of the transaction system.

In one embodiment, the present invention is directed to an apparatus for reducing fraud in electronic payment transactions, where the apparatus includes a processor configured to execute a set of instructions, a memory coupled to the processor for storing the set of instructions, and the set of instructions stored in the memory, wherein when executed by the processor the instructions implement a method to receive a plurality of authorization messages at a payment processor, wherein each authorization message includes data regarding a consumer device used in an electronic payment transaction and the same consumer device is used in each of the electronic payment transactions, process the authorization messages to determine if the consumer device is associated with one or more fraudulent transactions, and blacklist the consumer device if the consumer device is associated with one or more fraudulent transactions.

In another embodiment, the present invention is directed to a method of reducing fraud in electronic payment transactions, where the method includes receiving a plurality of authorization messages at a payment processor, wherein each authorization message includes data regarding a consumer device used in an electronic payment transaction and the same consumer device is used in each of the electronic payment transactions, processing the authorization messages to determine if the consumer device is associated with one or more fraudulent transactions, and blacklisting the consumer device if the consumer device is associated with one or more fraudulent transactions.

In yet another embodiment, the present invention is directed to a method of reducing fraud in electronic payment transactions and to an apparatus for implementing the method, where the method includes receiving an authorization message for a first transaction initiated by a device, the authorization message including a first account number, receiving an authorization message for a second transaction initiated by the device, the authorization message including a second account number, and blacklisting the device if the first transaction and the second transactions are declined.

In yet another embodiment, the present invention is directed to a system for reducing fraud in electronic payment transactions, where the system includes means for generating a plurality of authorization messages, wherein each of the plurality of authorization messages is generated for a respective electronic payment transaction and includes data regarding a consumer device used in the electronic payment transaction, the same consumer device being used in each of the electronic payment transactions, means for receiving the plurality of authorization messages and processing the authorization messages to determine if the consumer device is associated with one or more fraudulent transactions, and means for blacklisting the consumer device if the consumer device is associated with one or more fraudulent transactions.

Other objects and advantages of the present invention will be apparent to one of ordinary skill in the art upon review of the detailed description of the present invention and the included figures.

DETAILED DESCRIPTION

Before proceeding to describe one or more embodiments of the present invention, and to assist with providing a better understanding of the invention, it may be useful to define some terms that will be used in describing the inventive system and method. In the context of the present invention:

A "consumer" is a customer to a transaction, or user of a payment device or device into which payment data may be entered and provided to a merchant as part of a transaction.

A "merchant" is a provider of goods or services to a consumer and is a party to a transaction initiated by a consumer. A merchant may be physically present at a transaction or conduct a transaction remotely, for example, via a network connection.

A "payment device" is a credit card, debit card, or other device or element from which payment data may be read or otherwise communicated. Payment devices are typically used in card present transactions.

A "consumer device" is a device into which a consumer enters payment or account data, with that data being communicated to a merchant as part of a transaction. Example consumer devices include, but are not limited to, home or business computers, mobile phones, PDAs, laptop computers, and the like. Consumer devices are typically used in card not present transactions, such as electronic commerce transactions conducted over the Internet.

"Blacklisting" a device such as a computer or mobile phone refers to a process of identifying the device as the source of one or more fraudulent or otherwise inappropriate transactions, and as a result, denying authorization of a future transaction initiated using that device. Blacklisting may be applied to both consumer devices and merchant devices (such as point of sale terminals).

"Gray-listing" a device such as a computer or mobile phone refers to a process of identifying the device as the source of one or more fraudulent or otherwise inappropriate transactions, and as a result, potentially denying authorization of a future transaction initiated using that device. Gray-listing may be applied to both consumer devices and merchant devices (such as point of sale terminals). In the event that a device is gray-listed, authorization of a future transaction may be contingent on characteristics of the account being used for the transaction, characteristics of the transaction, or providing other requested information or assurances regarding the transaction, for example.

As will be described, embodiments of the present invention are directed to a system, apparatus, and method for reducing fraud in electronic payment transactions by identifying consumer or merchant devices that may have been used to initiate fraudulent transactions, and then preventing the authorization of future transactions that are initiated using those devices.

Figure 1:
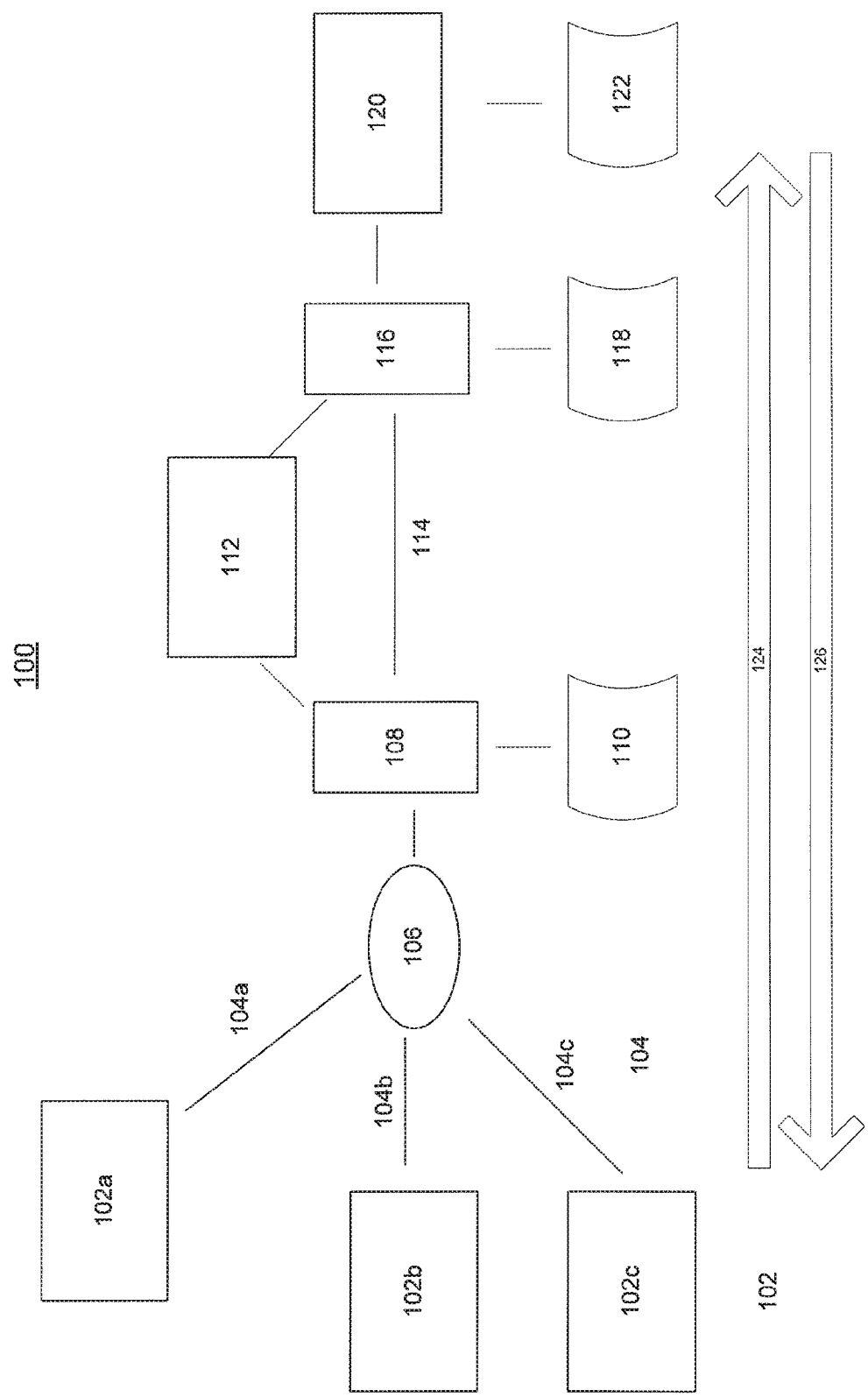
FIG. 1 is a functional block diagram illustrating the primary functional elements of an exemplary system for authorizing an electronic payment transaction.

Prior to describing one or more embodiments of the invention in greater detail, a brief discussion of the entities involved in authorizing an electronic payment transaction and their roles in the authorization process will be presented with regards to FIG. 1, which is a functional block diagram illustrating the primary functional elements of an exemplary system 100 for authorizing an electronic payment transaction. As shown in FIG. 1, in a typical transaction, a consumer wishing to purchase a good or service from a merchant provides payment transaction data that may be used as part of an authorization process by means of a device 102. The consumer may utilize a payment device such as a card having a magnetic strip encoded with account data or other relevant data (e.g., a standard credit or debit card) to initiate the transaction. In an E-commerce (electronic commerce) transaction, the consumer may enter data into a consumer device capable of communicating with a merchant or other element of system 100, such as a laptop or personal computer. The consumer may also initiate the transaction using data stored in and provided from a suitable form of data storage device (such as a smart card, mobile phone, PDA, or transportable memory device). As examples, a card or similar payment device may be presented to a point of sale terminal 102a which scans or reads data from that card. Similarly, a consumer may enter payment account data into a computing device 102b, as part of an E-commerce transaction. Further, a consumer may enter payment account data into a cell phone or other wireless device 102c (e.g., a laptop computer or PDA) and have that data communicated to the transaction authorization network by the device (or have previously entered and stored data that is then accessed and provided to the network as part of the transaction). For purpose of the present invention, point of sale terminal 102a is an example of a merchant device and computing device 102b and cell phone or wireless device 102c are examples of a consumer device.

The payment account data (as well as any required consumer data) is communicated over a communication network 106 to the merchant's transaction processing system 108. The data may be provided to communication network 106 by any method or elements suitable for use with device 102. For example, if device 102 is a point of sale terminal 102a, then the data may be provided by a wireline phone connection or suitable form of connection to the Internet 104a or other network. If device 102 is a consumer's computing device 102b, then the data may be provided by a connection to the Internet 104b, such as a cable modem or wireless router. If device 102 is a cell phone or other wireless device 102c, then the data may be provided by a wireless network 104c to communication network 106. Depending on the merchant or transaction involved, communication network 106 may be the Internet, a closed network such as a corporate network, a wireless network, or other suitable form of data transport channel.

As part of the authorization process performed by the merchant, merchant transaction processing system 108 may access merchant database 110, which typically stores data regarding the consumer (as the result of a registration process with the merchant, for example), the consumer's payment device, and the consumer's transaction history with the merchant. Merchant transaction processing system 108 typically communicates with Merchant Acquirer 112 (which manages the merchant's accounts) as part of the overall authorization process. Merchant transaction processing system 108 and/or Merchant Acquirer 112 provide data to Payment Processing Network 116, which among other functions, participates in the clearance and settlement processes which are part of the overall transaction processing. Communication and data transfer between Merchant transaction processing system 108 and Payment Processing Network 116 may be by means of a direct connection 114 or by means of an intermediary, such as Merchant Acquirer 112. As part of the transaction authorization process, Payment Processing Network 116 may access account database 118, which typically contains information regarding the consumer's account payment history, chargeback or dispute history, credit worthiness, etc. Payment Processing Network 116 communicates with Issuer 120 as part of the authorization process, where Issuer 120 is the entity that issued the payment device (or provided another form of data to enable a consumer to pay for goods or services) to the consumer and manages the consumer's account. Consumer account data is typically stored in consumer database 122 which is accessed by Issuer 120 as part of the authorization and account management processes.

In standard operation, an authorization request message is created during a consumer purchase of a good or service at a point of sale (POS). The point of sale may be a merchant's physical location or a virtual point of sale such as a web-site that is part of an E-commerce transaction. In a typical transaction, the authorization request message is sent from the point of sale to the Merchant transaction processing system 108, then to the merchant's Acquirer 112, then the Payment Processing Network 116, and then to an Issuer 120. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised. In a typical transaction authorization process, an authorization request message is communicated between nodes as indicated by arrow 124 in FIG. 1, while an authorization response (i.e., an approval or denial by an issuer or payment processing network) is communicated between nodes as indicated by arrow 126 in FIG. 1.

Payment Processing Network 116 may include data processing subsystems, networks, and other means of implementing operations used to support and deliver authorization services, exception file services, and clearing and settlement services for payment transactions. An exemplary Payment Processing Network may include VisaNet™. Payment Processing Networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment Processing Network 116 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 116 may use any suitable wired or wireless network, including the Internet to permit communication and data transfer between network elements. Among other functions, Payment Processing Network 116 may be responsible for ensuring that a user is authorized to conduct the transaction (via an authentication process), confirm the identity of a party to a transaction (via receipt of a personal identification number), confirm a sufficient balance or credit line to permit a purchase, and reconcile the amount of purchase with the user's account (via entering a record of the transaction amount, date, etc.).

As depicted in FIG. 1, the authorization of a transaction typically involves decisions made at multiple nodes or elements of the authorization or transaction processing network. These nodes include, but are not limited to, the merchant, the merchant's Acquirer, the payment processor (or payment processing network), and the Issuer. Although a merchant may recognize that a particular device might be the source of multiple fraudulent transactions (such as a computer that is identified by its IP address), this information is not shared among the other nodes of the authorization network, and in particular, is not shared with other merchants. This may prevent other merchants from recognizing devices that have a history of being used in fraudulent transactions, and thereby reduce their ability to prevent losses that might arise from authorizing a transaction initiated by a user of such a device.

To address this problem, in some embodiments, the present invention is directed to an apparatus that includes a processor that executes instructions to implement a process for gathering information about a consumer device as part of an authorization message and processing that data to identify devices that may be the source of multiple fraudulent or otherwise undesirable transactions. After identifying devices that may be the source of multiple fraudulent or otherwise undesirable transactions, some or all of those devices may be selected for further evaluation. The further evaluation may include generating indicia of the potentially fraudulent use of the device, where the indicia may be a measure, score or other form of indicator based on transaction history, chargebacks, or other relevant data. If the indicia or other value exceeds a predetermined threshold, then the device may be "blacklisted", indicating that authorization should be denied by the payment processor for future transactions that are initiated using the device. Further, information about the fraudulent device may be supplied to other nodes of the authorization network (such as other merchants) to assist in reducing fraudulent transactions initiated using the device. In addition, if a merchant device, such as a point of sale terminal, is identified as a possible source of fraudulent transactions, then that device may also be blacklisted and future transactions initiated using that device may be denied authorization.

For example, by analyzing transaction and device related data collected from multiple merchants, a payment processing system (e.g., a payment processor) that is part of an authorization network may determine that a specific consumer device is the source of multiple fraudulent or questionable transactions. This may be based on a history of fraudulent transactions involving one or more accounts. The payment processor may then blacklist the device, thereby preventing authorization by the payment processor of future transactions that are initiated using that device (whether by the same or different users, or using the same or different accounts). This information may be recorded in a data store of the payment processing node or payment processor and used as the basis for denying authorization for future transactions initiated by the device. The information may also be provided to merchants that are part of subsequent transactions involving the customer device to assist those merchants in preventing fraud and thereby reduce potential losses.

In general, embodiments of the invention include, but are not limited to, being implemented as part of the following actions or transaction data processing stages, with each such action or transaction data processing stage capable of being implemented in the form of an apparatus that includes a processor executing a set of instructions, or as a method or system, among other embodiments:

Collection and processing of consumer device data as part of transactions involving different merchants to identify devices associated with one or more fraudulent or declined transactions, whether involving the same or different accounts;

Providing collected and processed consumer device data (or a determination that a device has been used in one or more fraudulent or declined transactions) to a merchant to assist the merchant in deciding whether to authorize a future transaction initiated using the consumer device; and Blacklisting a customer or merchant device that is found to be used in one or more fraudulent transactions so as to prevent authorization of future transactions initiated using that device.

These and other embodiments of the invention will now be described in greater detail with reference to FIGS. 2-4. In some embodiments, the present invention relates to the use of a node of the authorization network to process authorization messages from multiple transactions to obtain an indication of the fraudulent (or potentially fraudulent) use of a consumer device. Typically this processing will be performed by the payment processor or a processor executing a set of instructions, although it may be performed by other nodes of the authorization network without departing from the concept of the invention. Further, typically the authorization messages will contain consumer or merchant device identification data and will be generated by multiple merchants. The overview provided by the processing of multiple authorization messages may provide an indication of the unreliability or untrustworthiness of a consumer, account, or device that would not be apparent from processing transactions involving a single merchant.

As noted, in some embodiments, the multiple authorization messages may be processed to provide a measure, score, or other indicia of the untrustworthiness or potentially fraudulent usage of a device. If this measure, score, or other indicia exceeds a predetermined threshold, then the device may be "blacklisted" and this determination stored in the payment processor's data store. Upon receipt of an authorization message for a future transaction that was initiated using the device, the stored measure, score, indicia, or determination of being blacklisted may be provided to another node of the authorization network to assist that node in making an authorization decision for a specific transaction. Similarly, the measure, score, indicia, or determination of being blacklisted may be used by the payment processing network or payment processor to deny authorization for the transaction.

Figure 2:
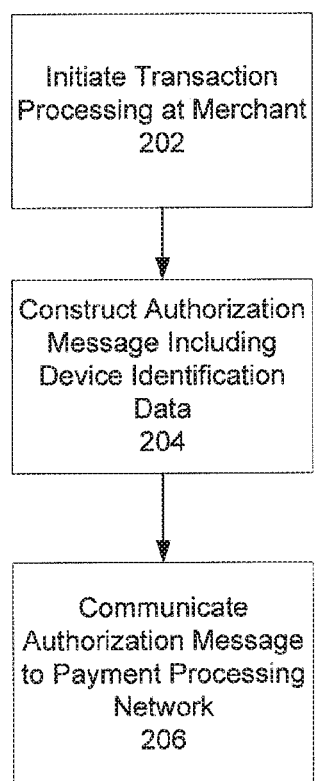
FIG. 2 is a flowchart illustrating a method for providing device identification data to a payment processing network or payment processor as part of reducing fraud in electronic payment transactions, in accordance with some embodiments of the present invention.

FIG. 2 is a flowchart illustrating a method 200 for providing device identification data to a payment processing network or payment processor as part of reducing fraud in electronic payment transactions, in accordance with some embodiments of the present invention. As shown in the figure, in a typical transaction, transaction data processing is initiated by a merchant (stage 202). Note that the transaction may be occurring in either a card present or card not present situation. The authorization message is constructed to include consumer and/or merchant device identification data, such as a computer identification number, IP (Internet Protocol) address, mobile phone number, or other suitable identifying number or character string (stage 204). This is data which is not generally used or sent to the Payment Processing Network as part of the transaction authorization process. The authorization message is then communicated to the payment processing network, for example, to a payment processor (stage 206). Note that the process depicted in FIG. 2 will typically be executed multiple times by different merchants, thereby generating multiple authorization messages that are provided to the payment processing network for analysis and subsequent use as the basis for identifying consumer or merchant devices that should be considered as the source of fraudulent transactions.

Figure 3:
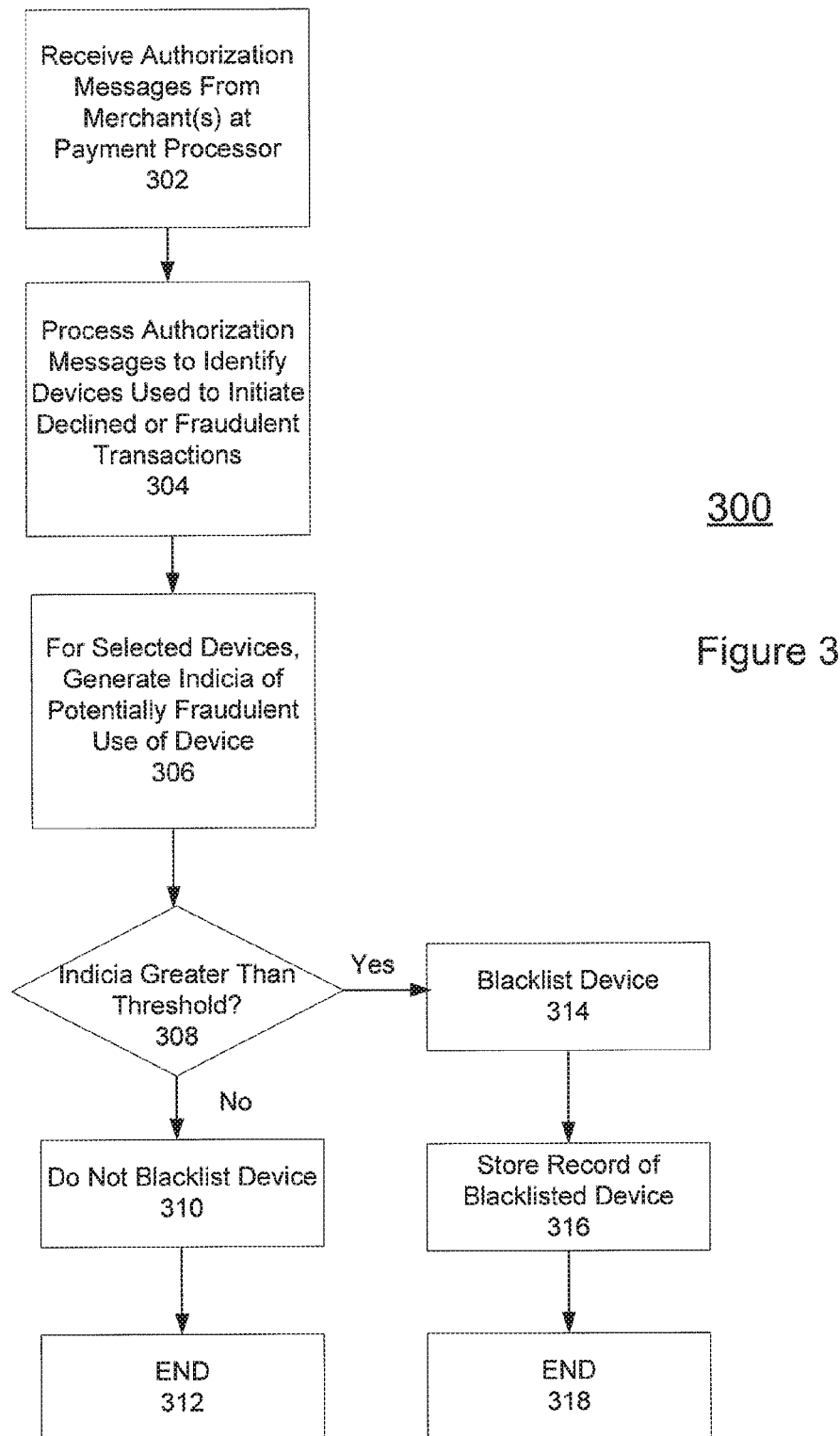
FIG. 3 is a flowchart illustrating a method for processing authorization messages containing device identification data and determining devices that should be the subject of a blacklist, in accordance with some embodiments of the present invention.

FIG. 3 is a flowchart illustrating a method 300 for processing authorization messages containing device identification data and determining devices that should be the subject of a blacklist, in accordance with some embodiments of the present invention. Although the stages of the method described with reference to FIG. 3 will be described as being implemented by a payment processor, note that they may be implemented, either partially or in their entirety, by another node of the authorization network without departing from the concept of the invention.

As shown in FIG. 3, the authorization message(s) generated by one or more merchants as part of electronic commerce transactions (as described with reference to FIG. 2) are received by the payment processor (stage 302). However, because the authorization message(s) contain additional information regarding a consumer or merchant device, the payment processor can process authorization messages from one or more merchants to identify devices that have been used to initiate declined or fraudulent transactions (stage 304). After processing, it may be determined that the declined or fraudulent transactions are associated with the same account (in which case multiple declined or fraudulent transactions may indicate a lost or stolen payment device from which account data is obtained) or with multiple accounts (which may indicate one or more users of the same device to initiate transactions). Further, the declined or fraudulent transactions may involve a single user with multiple accounts or multiple users with individual accounts.

Associating consumer or merchant devices with declined or fraudulent transactions initiated using those devices may be accomplished by any suitable data processing method. These include real-time monitoring of incoming transaction data and batch processing performed on transaction data after the data is stored and indexed.

Suitable data processing methods include, but are not limited to, identifying all transactions initiated by a particular consumer or merchant device and then determining which of those transactions were declined, fraudulent, or otherwise identified as undesirable (i.e., a device oriented approach). It may also be accomplished by cross-referencing all transactions declined, fraudulent, or otherwise identified as undesirable against the respective device identifier data and tabulating this result to produce a listing of all devices that are associated with more than a predetermined number of such transactions (i.e., a transaction oriented approach). Further, it may be accomplished by maintaining a real-time or pseudo real-time list of all declined, fraudulent, or otherwise identified as undesirable transactions and noting the associated device in a database, thereby keeping a running record of the devices found to be associated with such transactions.

Once the consumer or merchant devices that are associated with more than a predetermined number of declined, fraudulent, or otherwise undesirable transactions are identified, some or all of those devices may be selected for further investigation. The devices that will be the subject of further investigation may be selected based on the number or type of undesired transactions they have been used to initiate, a characteristic of the device that might indicate a greater or lesser likelihood of being used in a fraudulent manner, or another suitable measure.

For each device selected for further investigation, indicia may be generated for the device, where the indicia is a measure or other indicator of the potentially fraudulent use of the device (stage 306). The indicia may be a score, measure, or other suitable indicator of the likelihood or actuality that the device has been used in a fraudulent manner. Note that all of the devices identified at stage 304 may be selected for further investigation, or only a sub-set of those devices may be selected. Further, any device selected may automatically be considered to have been used in a fraudulent manner and hence blacklisted, or that may be determined based on further data processing (e.g., generation of the indicia).

For example, determining that a device has been or is likely to have been used in a fraudulent manner may be based on analysis of the number of declined transactions, the type of declined transactions, the number or type of transactions found to be fraudulent, the number or type of transactions involved in chargebacks, an accepted rating system, or another relevant characteristic of one or more of the transactions. The indicia may be a numerical representation of the number of such events, the number of occurrences of a particular characteristic of such events, a weighted average of a particular characteristic of such events, etc.

Once indicia has been generated for a selected device, the method determines if the indicia exceeds a predetermined threshold value (stage 308). The predetermined threshold value may be the same for all devices being considered or may be varied depending upon the device. If varied, the threshold may be based on one or more factors, including, but not limited to, previous transaction history for the device, percentage of fraudulent transactions initiated by the device, value of the fraudulent transactions initiated by the device, etc. Further, the threshold value may be varied with time (such as being set at one value for a first period of time and then being altered) depending on the transaction history with the device, future transactions initiated by the device, etc. Note that in some embodiments, or under some circumstances, a device involved in a fraudulent or declined transaction may automatically be black-listed, in which case stages 306 and 308 may not be utilized.

If the device indicia does not exceed the predetermined threshold value, then the device is not blacklisted (stage 310) and the process ends (stage 312). This has the practical effect of not altering the standard authorization process for a future transaction initiated using the device. However, if the device indicia exceed the predetermined threshold value, then the device is blacklisted (stage 314) and a record is made of this determination in a relevant data store (stage 316). At this point the process ends (stage 318). As will be described with reference to FIG. 4, this has the practical effect of altering the standard authorization process for a future transaction initiated using the device. This may be done by causing the future transaction to be automatically declined by the payment processor, by providing information regarding the blacklisting of the device to a merchant involved in the transaction, or another suitable action.

Figure 4:
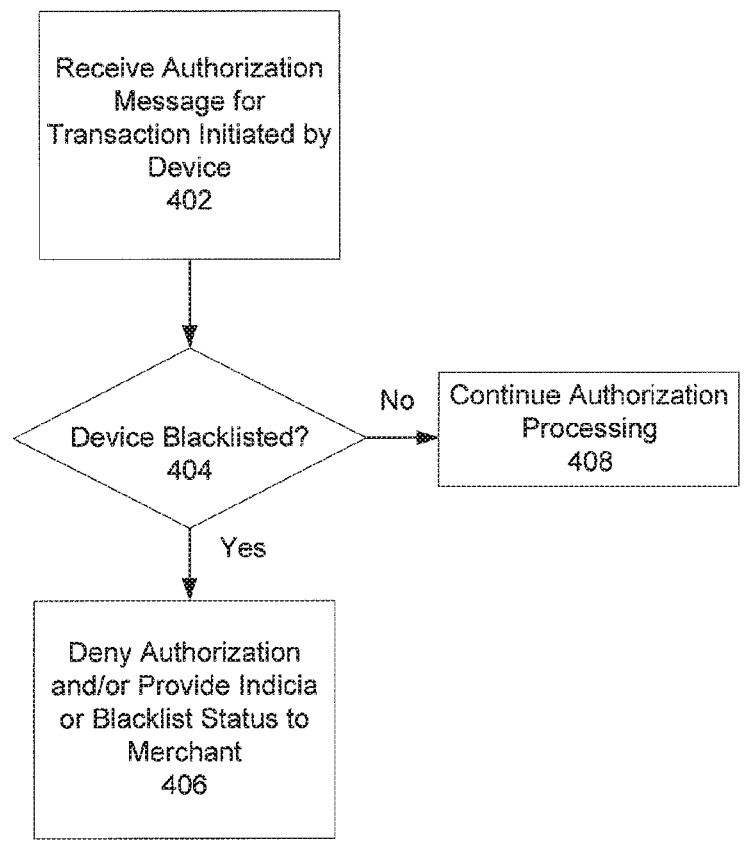
FIG. 4 is a flowchart illustrating a method for processing an authorization message for a transaction initiated by a blacklisted device, in accordance with some embodiments of the present invention.

FIG. 4 is a flowchart illustrating a method 400 for processing an authorization message for a transaction initiated by a blacklisted device, in accordance with some embodiments of the present invention. As shown in the figure, in some embodiments, method 400 may begin by receipt of an authorization message for a transaction initiated by a device at a payment processor or other node of the authorization network, where the node is involved in some or all of the stages of the method of FIG. 3 (stage 402). The authorization message will include device identification data, as described with reference to FIG. 2. The method of FIG. 4 then determines if the device is blacklisted, for example, by accessing a database or other data store containing a list of blacklisted devices (as depicted in stage 316 of FIG. 3). If the device is not blacklisted, then the standard authorization processing is continued (stage 408). However, if the device is blacklisted, then the standard authorization processing is discontinued and instead authorization for the transaction is denied. In addition to transaction denial or instead of denying the transaction, information regarding the device's status may be provided to the merchant involved in the transaction (stage 406). This information may include an indication of the device being blacklisted or its indicia of being involved in potentially fraudulent transactions, for example. Such information may assist a merchant in deciding whether to accept the transaction, what information or actions to condition acceptance of the transaction upon, or if the device is operating improperly or stolen, for example.

Note that instead of being blacklisted, a device may be "gray-listed", thereby indicating that future transactions involving the device should be subjected to greater than normal scrutiny, such as requiring additional assurances of validity or other suitable restrictions. For example, devices having indicia above a predetermined threshold but below a second predetermined threshold might remain eligible for transaction authorization but the consumer or merchant may be required to provide other information or satisfy other requirements before approval of a transaction initiated using that device.

The following description of additional use cases or possible scenarios in which the present invention might be used are intended as exemplary and not exhaustive, as other implementations and embodiments will be apparent to those of skill in the art.

As described, the present invention may be used to identify devices that are used to initiate fraudulent transactions, and to take actions to prevent or condition authorization of future transactions using that device. This typically arises in situations in which the same device is used for multiple fraudulent or otherwise undesirable transactions, and may involve one or more users and one or more accounts. In this regard, a typical scenario involves the same device being used to initiate more than one declined or fraudulent transaction, with each transaction being associated with a different account. Thus, if an authorization message is received for a first transaction involving a first account and an authorization message is received for a second transaction involving a second account, with both transactions being initiated using the same device, then if both transactions are declined, the device may be blacklisted.

However, detecting a fraudulently used device and blacklisting it may also occur in situations in which the same account is used for transactions initiated with different devices. In this case the invention may be used to determine which device or devices should be subjected to blacklisting and in some cases to detect the possibility of a stolen payment device.

For example, the account data for a consumer may be used in an E-commerce transaction with a merchant with whom the consumer has no previous relationship. The transaction data is sent to the payment processor for authorization as normal. However, in this case the computer ID (or other consumer device data) for the transaction does not match the computer ID for the account stored in the database of the payment processing network. However, the issuer approves the transaction. The payment processing network makes note of the different computer ID, and flags such a change. The transaction clears and settles, but later the transaction is charged back to the merchant and it is determined that the payment device was reported stolen.

The payment processing network can now associate the new computer ID with the fraudulent use of the account that is associated with the payment device. The next time this computer ID is used to process any transaction for any E-commerce merchant, the payment processing network can provide an indication that the device is blacklisted and that the transaction should not be approved. In this case, the later merchant is the beneficiary of the data being stored and analyzed by the payment processing network. Similarly to the collection and processing of computer ID data as a way of identifying potentially fraudulent transactions, cell phone ID or other consumer device data may also be used. The cell phone ID number or phone number can be collected, analyzed, correlated, and flagged as "bad" if a transaction or transactions initiated using it were later charged back to a merchant or proven to be fraudulent.

The previously described scenarios concerned processing transaction data from one or more merchants and providing indications of the potentially fraudulent use of a consumer device to a different merchant. Another use of the invention is to identify potentially fraudulent use of a device being used by a single merchant, or being used to mimic transactions from a reputable merchant. For example, if a point of sale terminal were used by a merchant to conduct transactions that were regularly proven to be fraudulent, it would be possible to detect this at the payment processing network and blacklist the point of sale terminal. As with the other scenarios described, the payment processing network is in a position to correlate fraudulent activity with accounts and devices, and provide this information to other merchants as an aid in making their authorization decisions.

Figure 5:
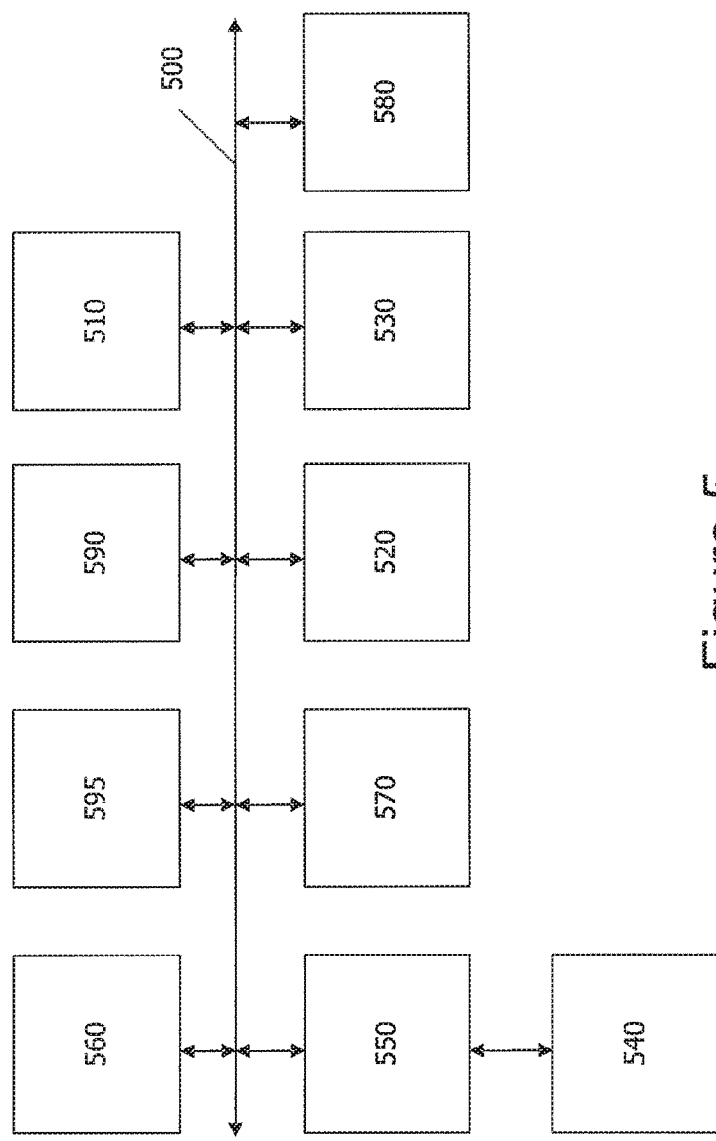
FIG. 5 is a block diagram of elements that may be present in a computer device or system configured to execute a method or process for reducing fraud in electronic payment transactions, in accordance with some embodiments of the invention.

In some embodiments, the inventive methods, processes or operations for reducing fraud in electronic payment transactions may be wholly or partially implemented in the form of a set of instructions executed by a central processing unit (CPU) or microprocessor. The CPU or microprocessor may be incorporated in an apparatus, server or other computing device operated by, or in communication with, a node of the authorization network. As an example, FIG. 5 is a block diagram of elements that may be present in a computer device or system configured to execute a method or process for reducing fraud in electronic payment transactions, in accordance with some embodiments of the invention. The subsystems shown in FIG. 5 are interconnected via a system bus 500. Additional subsystems such as a printer 510, a keyboard 520, a fixed disk 530, a monitor 540, which is coupled to a display adapter 550, and others are shown. Peripherals and input/output (I/O) devices, which couple to an I/O controller 560, can be connected to the computer system by any number of means known in the art, such as a serial port 570. For example, the serial port 570 or an external interface 580 can be used to connect the computer apparatus to a wide area network such as the Internet, a mouse input device, or a scanner. The interconnection via the system bus 500 allows a central processor 590 to communicate with each subsystem and to control the execution of instructions that may be stored in a system memory 595 or the fixed disk 530, as well as the exchange of information between subsystems. The system memory 595 and/or the fixed disk 530 may embody a computer readable medium.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a" "an" or "the" is intended to mean "at least one," unless specifically indicated to the contrary.

What is claimed is:

1. An apparatus for reducing fraud in electronic payment transactions, comprising:
   a processor configured to execute a set of instructions;
   a memory coupled to the processor for storing the set of instructions; and
   the set of instructions stored in the memory, wherein when the set of instructions are executed by the processor, the apparatus operates to:
     receive a plurality of authorization messages associated with a plurality of transactions, each authorization message comprising an account number and device identification data uniquely identifying a transaction processing device of a merchant used to conduct an associated transaction;
     identify, using the device identification data, that the same transaction processing device being used to conduct each of the transactions;
     process the authorization messages to determine that the transaction processing device was previously used to conduct one or more declined or fraudulent transactions;
     determine a score for the transaction processing device based on a number and type of the one or more declined or fraudulent transactions;
     blacklist the transaction processing device when the score exceeds a predetermined threshold, wherein the transaction processing device is a point of sale terminal of the merchant;
     store the score and determination of blacklisting the transaction processing device;
     receive a subsequent authorization message from a merchant computer associated with the transaction processing device of the merchant for authorization of a subsequent transaction initiated with the merchant computer;
     communicate, after receiving the subsequent authorization message, that the transaction processing device of the merchant is blacklisted to the merchant computer of the merchant as part of an authorization process for the subsequent transaction; and
     deny authorization for the subsequent transaction based on the score and determination of blacklisting the transaction processing device.

2. The apparatus of claim 1, wherein the plurality of authorization messages are generated from transactions involving more than one payment account.

3. The apparatus of claim 1, wherein processing the plurality of authorization messages to determine that the transaction processing device was used to conduct the one or more declined or fraudulent transactions further comprises associating the transaction processing device with a plurality of previously conducted declined or fraudulent transactions.

4. The apparatus of claim 1, wherein the apparatus further operates to:
   gray-list the transaction processing device if the score exceeds a second predetermined threshold and is below the predetermined threshold.

5. The apparatus of claim 4, wherein gray-listing the transaction processing device further comprises requiring that authorization of a future transaction being conducted with the transaction processing device depend upon one or more of:
   additional information provided by the merchant with whom the future transaction is being conducted; or
   satisfaction of a condition or requirement imposed on the transaction processing device.

6. The apparatus of claim 1, wherein the predetermined threshold depends upon one or more factors associated with the transaction processing device.

7. The apparatus of claim 6, wherein the one or more factors include a previous transaction history for the transaction processing device, percentage of fraudulent transactions initiated by the transaction processing device or total value of the fraudulent transactions initiated by transaction processing device.

8. The apparatus of claim 1, wherein the apparatus further operates to:
   inform at least one additional node in an authorization network that the transaction processing device is blacklisted, the authorization network including at least the apparatus, the merchant computer and the at least one additional node.

9. The apparatus of claim 8, wherein the apparatus is a first transaction processing network and the at least one additional node is an issuer or a second transaction processing network.

10. A method of reducing fraud in electronic payment transactions, comprising:
    receiving, by a server computer, a plurality of authorization messages associated with a plurality of transactions, each authorization message comprising an account number and device identification data uniquely identifying a transaction processing device of a merchant used to conduct an associated transaction;
    identifying, by the server computer using the device identification data, that the same transaction processing device being used to conduct each of the transactions;

processing, by the server computer, the authorization messages to determine that the transaction processing device was previously used to conduct one or more declined or fraudulent transactions;

determining, by the server computer, a score for the transaction processing device based on a number and type of the one or more declined or fraudulent transactions;

blacklisting, by the server computer, the transaction processing device when the score exceeds a predetermined threshold, wherein the transaction processing device is a point of sale terminal of the merchant;

storing, by the server computer, the score and determination of blacklisting the transaction processing device;

receiving, by the server computer, a subsequent authorization message from a merchant computer associated with the transaction processing device of the merchant for authorization of a subsequent transaction initiated with the merchant computer;

communicating, by the server computer after receiving the subsequent authorization message, that the transaction processing device of the merchant is blacklisted to the merchant computer of the merchant as part of an authorization process for the subsequent transaction; and denying, by the server computer, authorization for the subsequent transaction based on the score and determination of blacklisting the transaction processing device.

11. The method of claim 10, wherein the plurality of authorization messages are generated from transactions involving more than one payment account.

12. The method of claim 10, wherein processing the plurality of authorization messages to determine that the transaction processing device was used to conduct the one or more declined or fraudulent transactions further comprises associating the transaction processing device with a plurality of previously conducted declined or fraudulent transactions.

13. The method of claim 10, further comprising:
gray-listing the transaction processing device if the score exceeds a second predetermined threshold and is below the predetermined threshold.

14. The method of claim 13, wherein gray-listing the transaction processing device further comprises requiring that authorization of a future transaction being conducted with the transaction processing device depend upon one or more of:
additional information provided by the merchant with whom the future transaction is being conducted; or
satisfaction of a condition or requirement imposed on the transaction processing device.

15. The method of claim 10, wherein the predetermined threshold depends upon one or more factors associated with the transaction processing device.

16. The method of claim 15, wherein the one or more factors include a previous transaction history for the transaction processing device, percentage of fraudulent transactions initiated by the transaction processing device or total value of the fraudulent transactions initiated by transaction processing device.

17. The method of claim 10, further comprising:
informing at least one additional node in an authorization network that the transaction processing device is blacklisted, the authorization network including at least the server computer, the merchant computer and the at least one additional node.

18. The method of claim 17, wherein the server computer is a first transaction processing network and the at least one additional node is an issuer or a second transaction processing network.

* * * * *